June 16, 1964  R. W. ETTER  3,137,271
MEANS AND METHOD FOR TENDING DOMESTIC ANIMALS
Filed Feb. 6, 1963
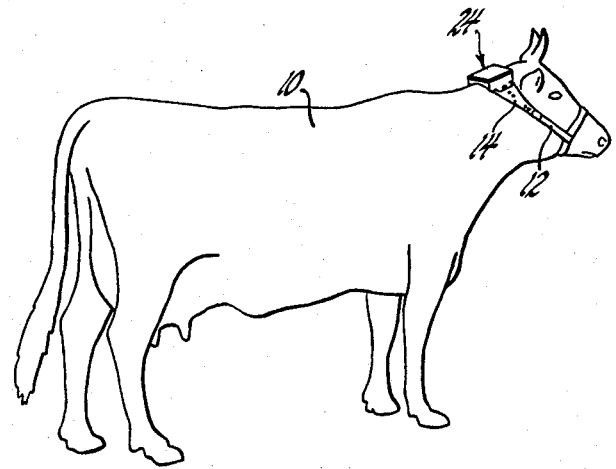
Fig. 1
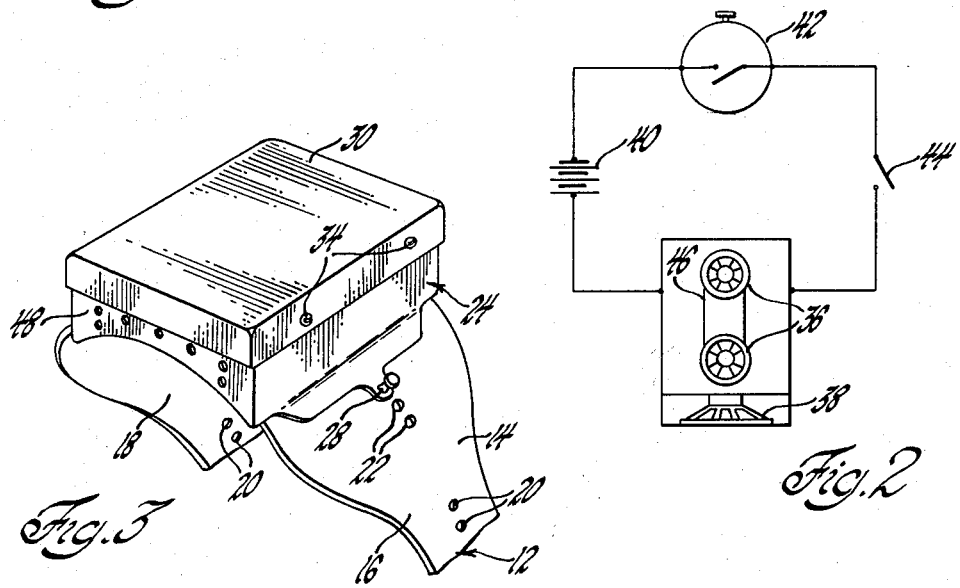
Fig. 3
Fig. 2
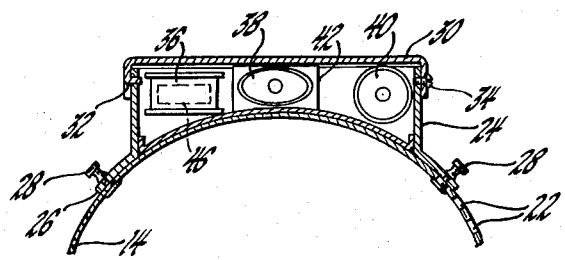
Fig. 4
INVENTOR.
Robert W. Etter
BY
Dale A. Winnie
ATTORNEY

United States Patent Office
3,137,271
Patented June 16, 1964

3,137,271
MEANS AND METHOD FOR TENDING DOMESTIC ANIMALS
Robert W. Etter, 360 Hamilton Ave., Birmingham, Mich.
Filed Feb. 6, 1963, Ser. No. 256,659
5 Claims. (Cl. 119—29)

This invention relates to means and methods for tending domestic animals and more particularly those pastured in herds; as for example dairy cows.

The management of dairy cows for maximum milk production requires that members of a herd be as content and well adjusted as possible. To this end, it has been recognized that cows have a well established herd order and that they are quick to make associations with pleasant and unpleasant experiences involving persons, places and objects.

Every herd has a lead cow at the top of the social order followed successively by other members of the herd. Younger members developing in a herd normally accept the supremacy of the leader and normal succession occurs on the removal or death of the lead cow unless an ambitious outsider is introduced to the herd.

The sensitivity of cows to pleasant and unpleasant experiences stems from this regular pattern of tranquility and makes the care given by caretakers and milkers extremely important. The mere presence of a veterinarian previously having inflicted some pain as a necessity of treatment has been recognized to cause excitement and nervousness in a herd with a falling off of milk production. Accordingly, cows must be handled in a manner producing pleasant associations so that they will be relaxed and at ease at all times.

Although it is common to herd cows by the use of dogs, those most familiar with the use of a canine shepherd will emphasize that the dog seldom barks, nips at the cows or otherwise excites the members of a herd. Normally, his presence at milking time serves as a reminder of a pleasant association and the herd responds without coaxing.

It follows and will be appreciated that regularity is important to dairy cows. A cow is very much a creature of habit and any disruption in her daily routine often causes milk production to fall off. For this reason, the time set for feeding and milking should be followed as punctually as possible. A cow that is accustomed to being fed before milking will often fail to let down all of her milk if the normal pattern is disrupted.

Much that has been said with respect to dairy cows applies equally as well to other dairy animals and in many regards applies to other animals that travel in groups and even household pets that are pampered and become used to a regular routine.

Normally, the human is not disposed to establish a pattern of behavior or servitude to an animal which completely satisfies the clock-like routine the animal calls for. The dairy farmer, more of necessity than desire, rises early to feed and pasture his animals and tramps through mud and snow in all kinds of weather to collect his herd for milking, etc.

Although automation and various improvements in mechanization has greatly aided the dairy farmer and others that care for animals, the necessity of personal attention to the animals for best response still prevails. With full appreciation of this fact, it is the principal object of this invention to provide a means of affording such personal attention without the necessity of physical presence or attention to the matter at hand.

It is an object of this invention to teach the method of tending domestic animals which includes attaching a play-back recorder with a pre-recorded instructional message in the master's voice attached to the conventional tethering means used with the animal.

Further objects of this invention include providing a self-contained, lightweight and compact device for transmitting the recording at prescribed and set times, providing clocklike regularity, and having the voice transmitting speaker disposed near but away from the ears of the animal to permit more volume where desired.

These and other objects and advantages to be gained in the practice of this invention will be better understood and appreciated upon a reading of the following specification in regard to a preferred embodiment of the invention and having reference to the accompanying drawings wherein:

FIGURE 1 shows a dairy cow having the present invention provided on the halter.

FIGURE 2 shows a simple diagrammatic circuit for the device of this invention.

FIGURE 3 is a perspective view of the recording device as incorporated on a part of a halter.

FIGURE 4 is a cross-sectional and diagrammatic illustration of the recorder of this invention showing the major components thereof.

A dairy farmer is normally required to rise early in the morning and go out to the pastures and bring in the cows. Despite the weather condition, this is a daily chore that must be regularly performed and, as previously mentioned, with reasonable consistence as to time.

Since this is an early morning chore it cannot be performed in any way that disturbs other animals, members of the household, or neighbors. Thus, any type of bell, siren or other long range audible signal is of no value. Furthermore, the training of a lead animal to respond to an unusual and disturbing sound is difficult and retraining would be necessary every time a lead cow changed. Similarly, the use of a good dog has shortcomings in that the dog must be trained, alerted and sent out and age and time changes a dog's temperament, agility and usefulness.

The personal herding of cows or tending of other animals also has the disadvantage of having to locate, reach and collect the animals together.

The present invention obviates all of these difficulties while preserving the advantages of personal attention. Herds may be instructed to relocate and feed in the earliest hours of the morning and even before the farmer is up. They may be called in from pasture for milking at a later time and in the gentle and persistent manner to which they are accustomed.

No punishment is inflicted for disobedience, as in the use of some animal training devices, and excitement and nervousness is avoided through the familiarity of their master's or caretaker's voice.

Advantage can be made of the social order of a herd by having the device of this invention provided only on the lead animal. At the same time reasonable volume can be used to instruct the lead cows and others in her close proximity.

The device of this invention is equally adaptable for use with the farm dog to arouse him and set him on certain prescribed chores at prescribed times. The household pet may also be let out for an evening run and recalled without audible evidence to the neighbors and despite the distance the animal has traveled.

Referring now to the drawings in further detail:

A dairy cow 10 is shown by FIGURE 1 with a halter 12 disposed about her head. This is of the conventional type used to tether the animal in her stall for milking and otherwise.

The conventional halter 12 is modified only to the extent necessary to provide a slightly broader band 14 across the back of her neck. This broader band is such as is shown best by FIGURE 3 and includes strap ends 16 and 18 on opposite sides which may be engaged with separate buckles on the halter.

One such side buckle is shown in FIGURE 1.

The saddle band 14 includes successive buckle holes 20 in each of the strap ends 16 and 18 for adjustment of the band on the neck of the cow 10. It also includes successive holes 22 in the broader band part for fasteners for the recorder case 24.

The recorder case 24 is contoured to fit the back of the cow's neck and is received on the saddle band 14. It includes side flanges 26 with fasteners 28 extending therethrough to cooperating with a complementary fastener part under the adjustment holes 22.

The case 24 is preferably of a durable, weather resistant, dust-tight, damage free plastic or other material. It may serve as the case for the mechanism it carries or be a separate case therefor.

The recorder case 24 has a detachable cover 30 hinged at one side, as at 32 in FIGURE 4, and held by set screws 34 or the like.

The mechanism within the case 24 may be of the conventionally known pocket sized and lightweight magnetic tape or wire recorder type which includes reels 36, a speaker 38, battery power source 40 and a transistorized printed circuit (not shown). A timer device 42 is also provided and its function will be described as the discussion continues. A master control switch 44 is also provided, as might be expected.

The reels 36 are arranged in the case 24 to receive an endless tape or wire 46 on which is recorded the message, or messages, to be transmitted. This is preferably a magnetic tape or wire which can be erased and reused again and again. However, it may be a disposable tape without added cost (and perhaps savings in other circuitry simplifications) due to its small size. The most important factor is that it be a continuously playing tape either by its arrangement on the reels or otherwise in the control circuit.

It should be mentioned here that the recorder mechanism within the case 24 which is pertinent to this invention is only the transmitting or play-back portion. Although the receiving, erasing, and actual recording mechanism may be provided (and in acceptably small sized packages) this is not essential and other separate receiving, erasing and/or recording means may be used to prepare the tapes needed.

As shown by FIGURE 4, it is intended that all of the components of the recorder device be disposed in the case 24. This includes the timer control switch and master switch, although the one or the other, or both, may be made accessible through the end of the case if desired.

The speaker 38 is provided in a rearwardly disposed arrangement and a suitable weatherproofed speaker grill 48 is provided through the back end wall of the case 24. This disposition of the speaker and speaker grill is important in all instances in which any appreciable output volume is desired.

The recorder case 24, as attached to the halter 12, has the speaker grill purposely disposed rearwardly of the direction the cow faces. As will be appreciated, the transmission of the recorded message may be louder and made to carry to other animals as well, without disturbance or annoyance to the carrying animal, if the transmission does not blare directly into her ears. Although lower volume and accordingly a reverse disposition may be best for single animals, the arrangement shown is best for herd use.

As should be readily apparent, the use and operation of the disclosed device is quite simple and obvious.

A tape or wire 46 is prepared by one familiar to the animals with which it will be used. The message is preferably taped and played in the tone and manner that the animals are most used to hearing and to which they are the most receptive. Seldom will much trial and error testing be necessary though the equipment lends itself to such use.

Different messages may be provided on a single tape for play at different times or different tapes, tape packs, or even recording cases may be used with the same on different animals. These and untold numbers of other innovations in use will come to mind with but slight speculation.

In practice, an animal equipped with the device proposed is turned to pasture, or loose to roam, after the timer is set. At the time prescribed, the recorder device is actuated and the tape or wire recorded message is transmitted. The transmission may be continuous until the recorder is shut-off, or the timer may like-wise interrupt the transmission after a prescribed interval of time.

As will be appreciated, the timer enables an exact time setting for calling or otherwise instructing the animal, or animals, hearing the transmission and thereby provides a regularity producing a familiarization pattern adding to the contentment and tranquility of the animal.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:
1. The method of tending domestic animals, including:
   recording audible voice instructions familiar to animals to be tended,
   providing a play-back recorder receptive of said recording on an animal familiar with the voice thereof,
   and timing said recorder for subsequent operation and transmission of said instructions as desired.
2. The method of tending domestic animals as provided by claim 1, including:
   mounting said recorder on the neck and behind the ears of a lead animal of a herd,
   and directing said transmission rearwardly of said lead animal for softer communications with said lead animal and attention attracting communication with other animals of said herd.
3. A device for use in tending a herd of dairy cows, comprising:
   tethering means for the lead cow of a herd,
   a self-contained and portable recording transmittor having means of attachment to said tethering means in close proximity to the ears of said lead cow,
   an endless recording transcription of a voice familiar to said lead cow for use by said transmittor and giving herding instructions to said lead cow,
   and timing means provided in said transmittor for starting and ending the playing of said transcription automatically.
4. The herd tending device of claim 3: said transmittor having the speaker thereof disposed rearwardly of the ears of said lead cow to permit greater volume for transmission to and the attraction of other cows of said herd as well as said lead cow.
5. The method of tending a domestic animal, comprising: making a record of voice commands of a human being whose voice is familiar to a particular animal, attaching record playing means in protective and audible relation about the neck of an animal, playing said record on said record playing means for reproducing said familiar voice commands in the absence of said human being, and timing said record playing means for playing said record at a subsequent prescribed time.

References Cited in the file of this patent
UNITED STATES PATENTS

| | | |
|---|---|---|
| 2,581,714 | Rovere | Jan. 8, 1952 |
| 2,794,576 | Reynolds | June 4, 1957 |
| 2,982,552 | Kent | May 2, 1961 |
| 2,996,043 | Pettingill | Aug. 15, 1961 |